Patented July 4, 1933

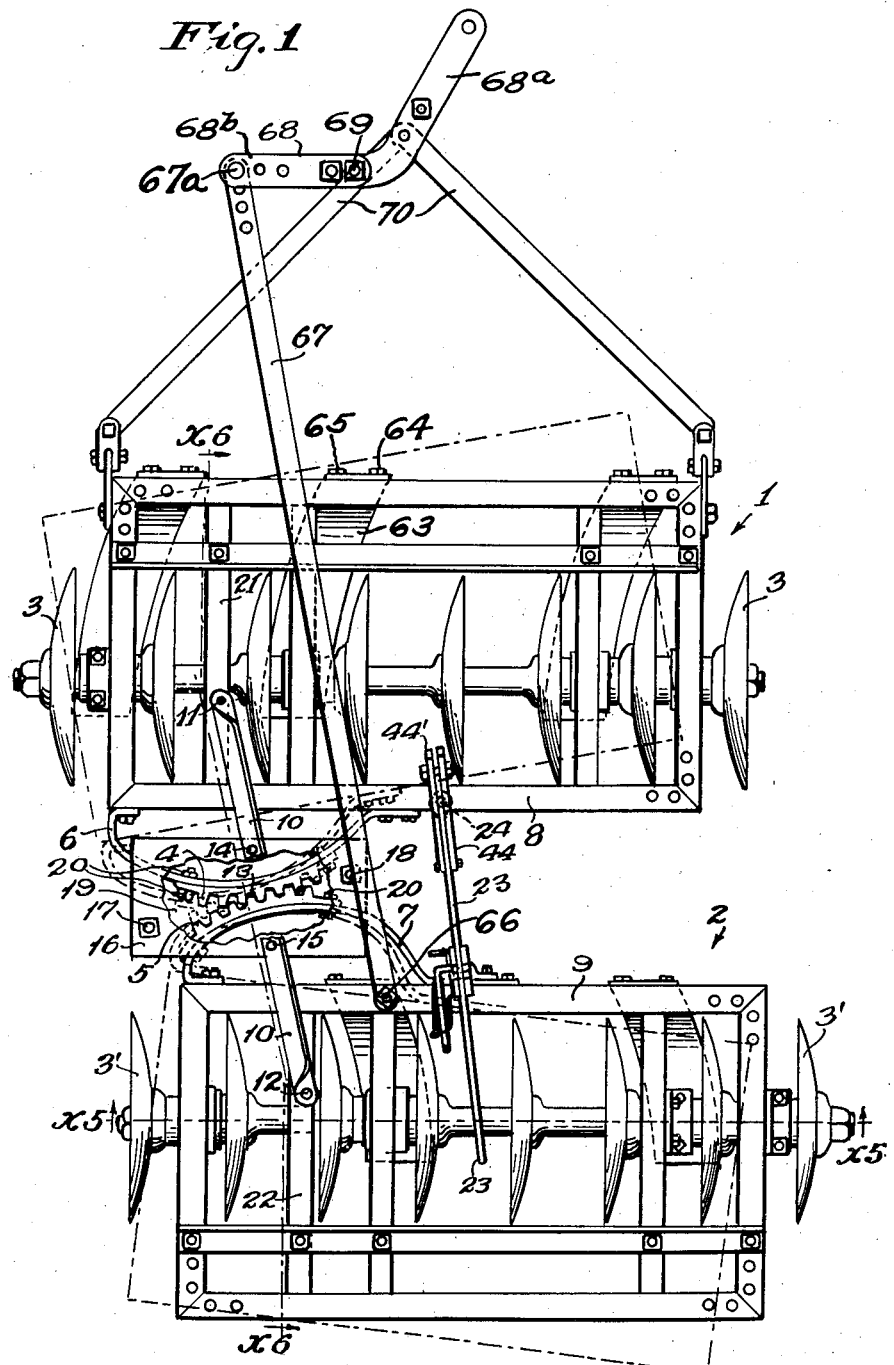

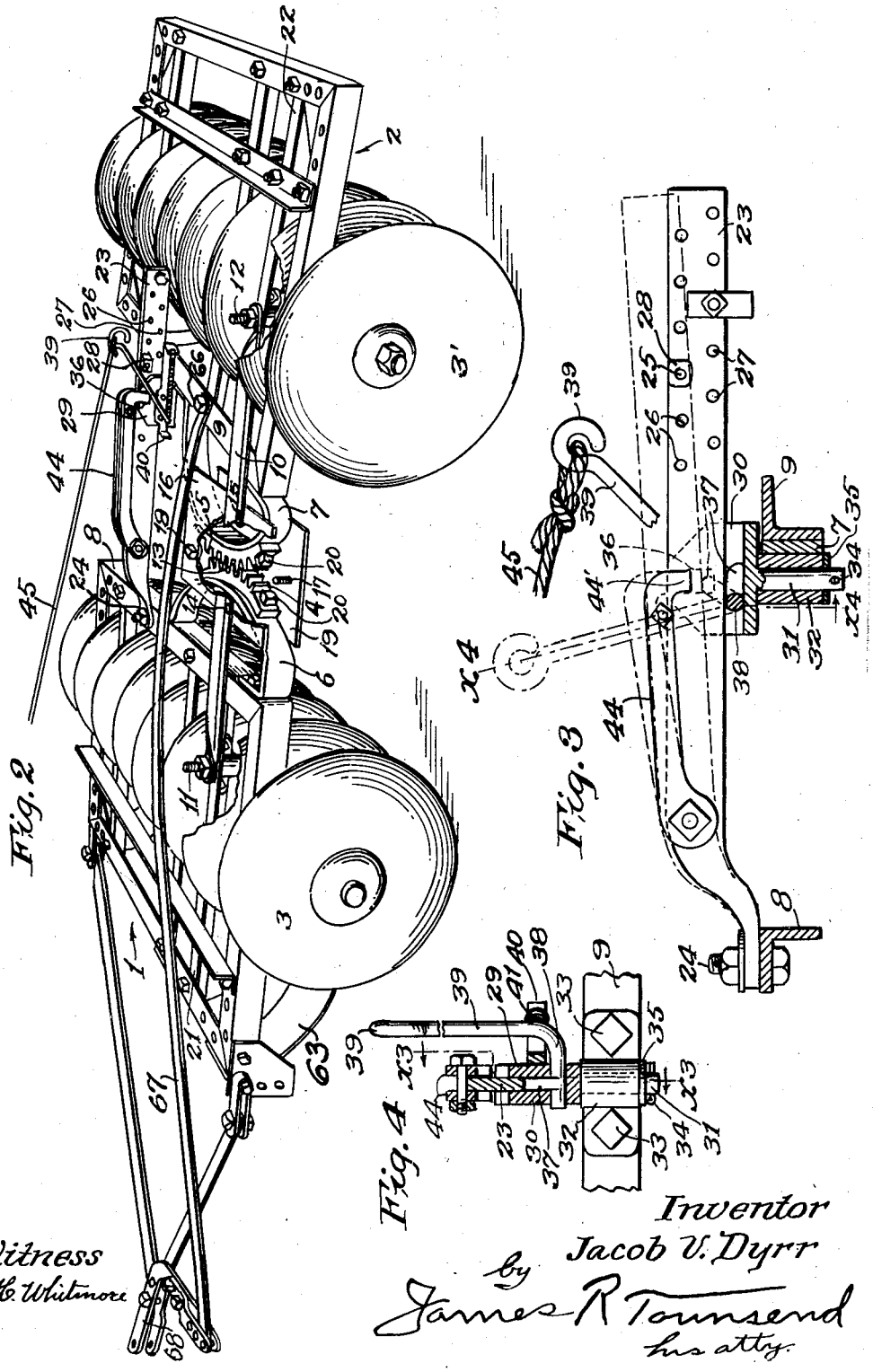

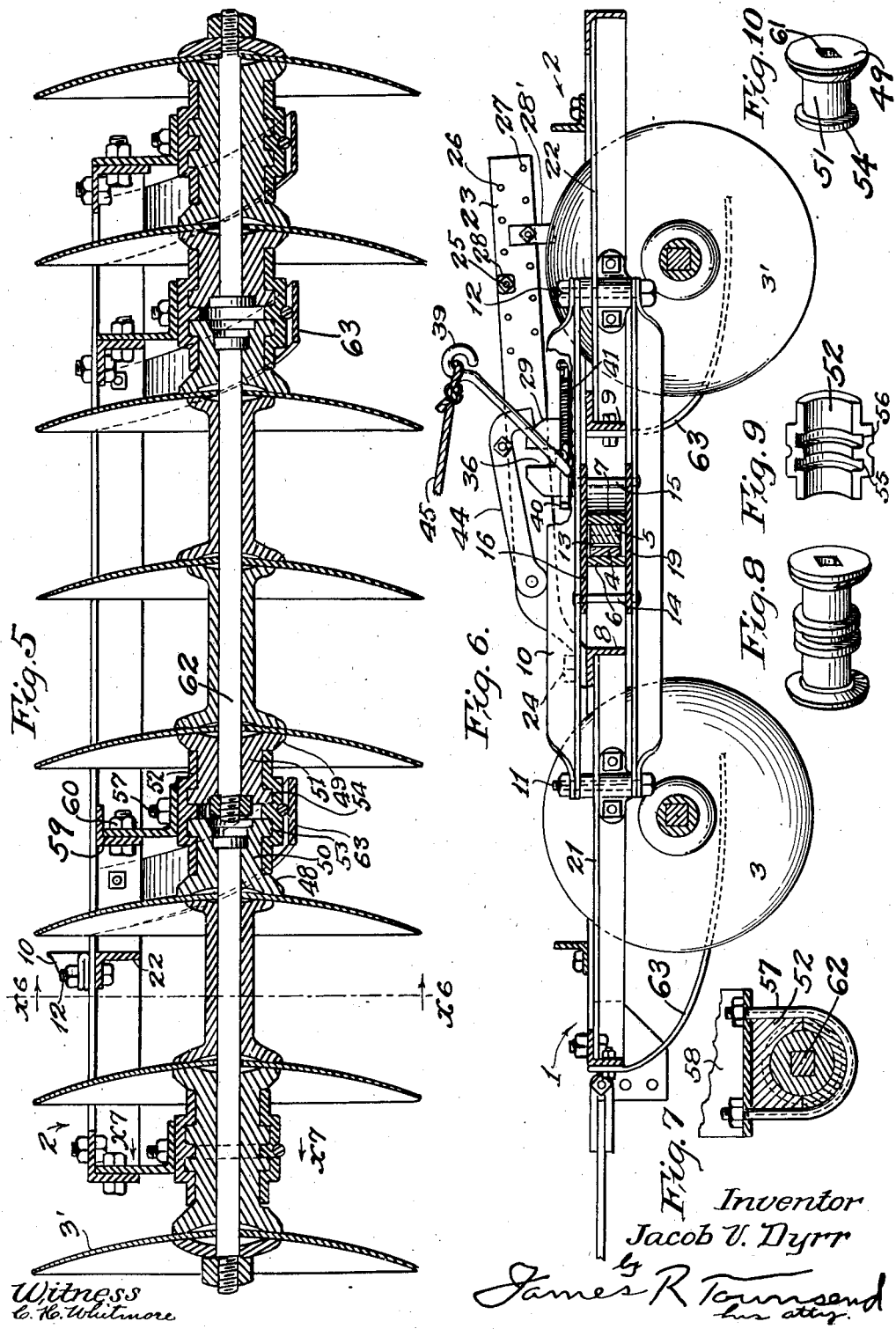

1,916,720

UNITED STATES PATENT OFFICE

JACOB V. DYRR, OF BELL, CALIFORNIA

INTERGEARED OFFSET DISK HARROW

Application filed February 2, 1931. Serial No. 512,877.

This invention relates to that class of ground working implements in which two gangs of harrow disks are mounted on front and rear frames, and such frames are connected together, one in front of the other, and are laterally offset and are drawn by a tractor connected to the front harrow frame; and I have provided coupling means between the frames adapted to cause appropriate tracking of the disks of the two frames.

The disks of the front and rear harrows are oppositely concaved and the connection between the two harrow frames is such that the frames may be adjusted to cause the planes of the edges of the disks of one gang to be at an angle to those of the other gang, and also at an angle to the general course of the harrow, which angle is determined by the operator who controls a latch arranged for such purpose.

It is customary to so construct harrows of the multiple disk type, that the disks will properly track when the implement is advancing in a straight line, and that the harrow frames and disks are so arranged that when it is desired to turn from a straight line, this can be done by driving the tractor to the left, making what is termed a left-hand turn, but it is found with such implements that a right-hand turn is not made with the same ease and facility as the left hand turn.

This results from the fact that the disks on the front harrow frame are concaved toward the right and those on the rear harrow frame are concaved toward the left, and if an attempt is made to make a right hand turn with such an arrangement of the disks, the opposing actions tend to up-set the front harrow toward the right and the rear harrow toward the left. It is thus found necessary to back up or straighten the harrow in a direct tandem before attempting to make a right hand turn.

An object of this invention is to make provision whereby the connection between the front and rear harrow frames will allow the implement to travel either straight forward or with a right hand turn or a left hand turn in ordinary soft ground and by which a slight adjustment from the seat of the tractor operator, will allow the implement to move straight forward or with a right hand turn, and will also allow the implement to adjust itself automatically from a right hand turn to a left hand turn or to a straight forward direction.

In practical operation when a harrow frame is turned either to the left or to the right, a certain amount of friction is encountered because of the differences of the arcs through which the several disks on the particular frame have to describe in making the turn.

A further object of this invention is to avoid much friction and opposition to movement.

A novel feature of this improved harrow is that the disks on each frame are differentially mounted relative to those of the other; and in carrying out this idea in a harrow having six to ten disks to a frame, I shall show three disk assemblies, each assembly being differential to the others. I provide spools for each assembly and mount the disks of each assembly on such spools.

A difficulty in the operation of disk harrows is encountered in fields in which different soils occur, in that a different adjustment is required for operation in hard soils than is required for operation in softer soils, so that in the softer soils it frequently occurs that the harrow becomes inoperative by sinking too deeply into the soil. To obviate this difficulty I provide each harrow frame with runners between the frame and the lower edge of the bearing, of sufficient breadth to prevent the disks from sinking too deeply into the soil.

A further feature of the invention is the provision of direct draft connection between the power draft hitch and the front-harrow frame, an excentric lever draft connection between the power draft hitch and the rear harrow frame, and an excentric rotation between the front and rear harrow frame whereby power from the tractor is automatically applied to turn and to guide the harrow in such a manner as to effect an even cultivation in whatever course the power hitch may move, either direct or devious; and I provide a rigid releasable latch connection between the two harrow frames to make such frames operate as a rigid unit when desired, and to allow flexible operation when the latch is released.

Other objects, advantages and features on invention may appear from the accompanying drawings, the subjoined detailed description and the appended claims.

The accompanying drawings illustrate the invention.

Figure 1 is a plan view of a sixteen disk double gang off-set harrow, constructed in accordance with this invention, the parts shown in solid lines being arranged for straight-away draft, and broken lines indicating the regular working position of the harrow frames and parts adapted to allow a left hand turn.

Fig. 2 is a perspective side view looking downward from the left side of Fig. 1.

Fig. 3 is a detail of the latch mechanism with sectional fragments of the rear bar of the front harrow frame and the front bar of the rear harrow frame and adjacent parts. Solid lines indicate the latched position and broken lines the unlatched position.

Fig. 4 is a detail partly in section on line $x4$, Fig. 3.

Fig. 5 is a section through the rear axle as shown on line $x5$, Fig. 1, omitting the parts in front of such axle.

Fig. 6 is a sectional elevation on line $x6$, Figs. 1 and 5 looking to the right.

Fig. 7 is a section on line $x7$, Fig. 5, looking to the left.

Fig. 8 is a perspective detail of an end bearing for one of the gangs of disks.

Fig. 9 is a perspective view of one half of one of the split bearings detached.

Fig. 10 is a detached perspective view of one of the differentials.

The front and rear frames 1 and 2, and the disks 3, 3' are of common construction and are provided with reversely arranged toothed segments 4, 5, connected respectively to the brackets 6, 7, which are in turn connected respectively to the frames 1 and 2; the segment 4 being fixed by bracket 6 to the rear bar 8 of the forward frame 1, and the rear segment 5 being fixed by bracket 7 to the front bar 9 of the rear frame, and there being a radius bar 10 extending across the racks and pivoted at 11 to the front frame and at 12 to the rear frame. These gear segments are preferably located nearer one end of the gangs as shown.

The pivot 11 is central to the arc of the rack segment 4 and the pivot 12 is central to the arc of the rack segment 5. Said rack segments are held in mesh with each other at 13 by the radius bar 10 which is riveted by the rivets 14, 15, to the upper housing plate 16 that is connected by bolts 17, 18, to the lower housing plate 19. The toothed segments 4 and 5 are fixed by bolts 20 to their respective brackets 6 and 7.

21 and 22 are cross bars of the frames respectively to which the ends of the radius bar 10 are pivoted by the pivots 11 and 12.

23 is an adjustment bar pivoted by pivot 24 to the rear bar 8 of the front frame 1 and adjustably connected by the adjusting bolt 25 adapted to be inserted through holes 26, 27 in the adjusting bar 23. Said bolt 25 is provided with a hub 28. The latch housing is composed of two plates 29, 30, fixed to a stem 31 that extends through a bearing block 32 that is fixed by bolts 33 to the front bar 9 of the rear frame 2. Said stem 31 is provided with a key 34 inserted through the stem and bearing against the washer 35 supported by the bearing block 32.

Said plates 29 and 30 are provided with notches 36 to receive the hub 28. Stop 25' is provided in adjusting bar 23 at a proper distance from the hub 28 to cause the hub to drop into the notch 36 when the stop 25' comes in contact with the latch housing plates 29, 30. A cam 37 is fixed to a shaft 38 which is journalled in the plates 29 and 30 of the latch housing and is operable by the latch lever 39 to cause the cam 37 to lift the adjustment bar 23 to bring the hub 28 outside of the notch 36, thus to allow the adjustment bar 23 and its tooth segments 4 and 5 to move relative to the frames 1 and 2 on the pivots 11 and 12 at the point 13 where the tooth segments meet. The relative movement thus determined between the front harrow and the rear harrow is positive and insures the proper movement of the disks of said frames relative to each other.

40 is a retainer for the cam shaft 38 and is shown as a bar bent at one end to form a stop for the lever 39 and at the other to fasten one end of spring 41, the other end of said spring being attached to the lever 39, said bar being fixed to the plate 29 by cap screws 42 and 43.

The spring 41 yieldingly holds the latch lever 39 in retracted position shown in Fig. 4. 44 is a lock composed of a pair of hooked arms pivotally connected at one end to the adjustment bar 23 the hooked ends 44' being adapted to drop into the notches 36 and thereby lock the frames 1 and 2 into neutral position for forward or backward movement. 45 is the latch operating connection which leads to the operator's station so that by pulling upon such connection the operator can release the hub 28 from the notch 36.

Referring specifically now to Fig. 5, two disks 3' fixed respectively to heads 48, 49 of spools 50 and 51, are journalled in the differential bearing 52 in which they are retained against axial displacement by the circular shoulders 53, 54, in the annular grooves 55, 56. Said bearing is formed of two pieces held together by U bolts 57.

The U bolts 57 connect the bearing 52, to an angle iron 58 which is bolted to a longitudinal angle iron bar 59 of the frame by means of a bolt 60. Said spools are provided with an angular shaft way 61 through which a shaft 62 extends to connect the spools of each disk assembly for common simultaneous rotation.

The front and rear frames are each provided with curved shoes or runners 63, fixed as by bolts 64, 65, to the front bar of each frame. These runners are arcuate and extend down from the frame underneath the bearings or spools so that they will rest upon the ground at their lower free ends to prevent the disks from sinking too deeply into the ground in soft soil.

Angular hitch bar 68 is pivoted at 69 to any suitable draft frame for the front gang, here shown as the two forwardly converging bars 70. The draft hitch bar has a forwardly and laterally extending arm 68a to which the tractor or other pulling means is directly connected. The other arm 68b extends laterally on the opposite side of pivot 69 from arm 68a, and to arm 68b is attached at 67a draft bar 67. Bar 67 is connected at 66 to the rear gang. This last point of connection is laterally removed from the means interconnecting the gangs, the gear segments, and when such interconnecting means is nearer one end of the gangs, point 66 is removed from the interconnecting means in the direction of the more distant gang end.

In the position of Fig. 1, the gangs are parallel to each other in a non-working position and are held so by bar 23 locked in position as described. When bar 23 is released, the rear gang is free to turn. The straight forward pull of the tractor tends to rotate hitch bar 68 counter-clockwise, and when the rear gang is unlocked from the parallel position, the power of the tractor transmitted through draft bar 67 angles the rear gang to the position shown by the dotted line rectangle. This turning motion of the rear gang is transmitted through the gear segments to turn the front gang to the position of the dotted line rectangle. This is the angled or normal working position.

Obviously a steady forward pull will hold the gangs in this position, but if the tractor turns to the right the bar 67 will pull the rear gang forward and both gangs will move toward the parallel position. Likewise, if the tractor turns left, the gangs will open to a greater angle between them. These changes in relative gang positions are very material aids in turning corners.

This application is a companion case to applicant's copending case, Ser. No. 544,354, filed June 15, 1931, which is in the nature of a continuation of this present earlier application. Said copending application is similar in subject matter to the present application; and between the two applications all generic claims and claims to common subject matter are carried by said latter application, while claims in this application are limited to specific subject matter peculiar to the showing of this case alone.

I claim:—

1. In a tractor operated ground working implement, forward and rearward framed gangs of ground working tools, means interconnecting the gangs for horizontal swinging movement comprising intermeshing gear segments mounted on the respective gangs, and draft means for the gangs; said draft means comprising a draft frame for the forward gang, an angular draft hitch bar pivoted to said draft frame and to which the tractor is connected, and a draft bar connected to the hitch bar and to the rear gang to angle both gangs into working position by a direct forward pull of the tractor; and locking means to lock said two gangs in a parallel, non-working position.

2. In a tractor operated ground working implement, forward and rearward framed gangs of ground working tools, means near one end of the gangs interconnecting the gangs for horizontal swinging movement, and draft means for the gangs; said draft means comprising a rigid draft frame for the forward gang, an angular draft hitch bar pivoted intermediate its ends to said draft frame, and a draft bar connected directly from the hitch bar to the rear gang at a point between said interconnecting means and the far end of the gang for angling said frames by draft power and means for locking said gangs in adjusted position.

3. In a tractor operated ground working implement, forward and rearward framed gangs of ground working tools, means near one end of the gangs interconnecting the gangs for horizontal swinging movement, and draft means for the gangs; said draft means comprising a rigid draft frame for the forward gang, an angular draft hitch bar pivoted intermediate its ends to said draft frame having a forwardly and laterally extending arm to which the tractor is connected and a laterally extending arm, and a draft bar connected directly from the laterally extending arm of the hitch bar to the rear gang at a point laterally removed from the interconnecting means for angling said frames by draft power and means for locking said gangs in adjusted position.

4. In a ground working implement having a frame, a plurality of axially alined shafts, ground working tools attached to said shafts, and a plurality of bearings attached to the frame and journaling the shafts for differential rotational motion; said bearings comprising two halves having annular grooves, spools attached to the ends of the shafts and journaled in the bearings, circular shoulders on the spools fitting within the bearing grooves to prevent axial displacement of the shafts, and means holding the bearing halves together and attaching the bearings to the frame.

5. In a tractor operated ground working implement, forward and rearward framed gangs of ground working tools, intermeshing gear segments mounted on the respective gangs to roll one on the other in a substantially horizontal plane, and draft means for the gangs; said draft means comprising an angular hitch bar connected at one end to the tractor, a draft frame for the forward gang pivotally connected to the angular hitch bar intermediate the ends of said bar, and a draft bar connected to the other end of the hitch bar and to the rear at a point laterally removed from the gear segments.

6. In a tractor operated ground working implement, forward and rearward framed gangs of ground working tools, intermeshing gear segments mounted on the respective gangs to roll one on the other in a substantially horizontal plane, a radius bar connecting the two gangs at points concentric with the gear segments, and draft means for the gangs; said draft means comprising an angular hitch bar connected at one end to the tractor, a draft frame for the forward gang pivotally connected to the angular hitch bar intermediate the ends of said bar, and a draft bar connected to the other end of the hitch bar and to the rear gang at a point laterally removed from its gear segments.

7. In a tractor operated ground working implement, forward and rear gangs of ground working tools, means interconnecting the gangs for relative movement in a horizontal plane and including a pair of contacting rolling surfaces restricting such relative movement to a rolling movement, and draft and angling means for the gangs, comprising a draft member for the forward gang, an angular draft hitch bar pivoted to the draft member and to which the tractor is connected, and a draft bar connected to the hitch bar and to the rear gang to angle that gang by draft power and, through the rolling interconnective means, to angle the front gang.

In testimony whereof, I have hereunto set my hand at Los Angeles, California, this 24th day of January, 1931.

JACOB V. DYRR.